US012803228B2

(12) United States Patent
Koyanagi

(10) Patent No.: US 12,803,228 B2
(45) Date of Patent: Nov. 17, 2026

(54) ELECTRICAL CONNECTOR PAIR

(71) Applicant: I-PEX Inc., Kyoto (JP)

(72) Inventor: Akito Koyanagi, Ogori (JP)

(73) Assignee: I-PEX Inc., Kyoto (JP)

( * ) Notice: Subject to any disclaimer, the term of this patent is extended or adjusted under 35 U.S.C. 154(b) by 338 days.

(21) Appl. No.: 18/741,567

(22) Filed: Jun. 12, 2024

(65) Prior Publication Data

US 2024/0421541 A1 Dec. 19, 2024

(30) Foreign Application Priority Data

Jun. 19, 2023 (JP) ................................ 2023-099862

(51) Int. Cl.

*H01R 13/6587* (2011.01)
*H01R 12/71* (2011.01)
*H01R 13/516* (2006.01)

(52) U.S. Cl.

CPC ....... *H01R 13/6587* (2013.01); *H01R 12/716* (2013.01); *H01R 13/516* (2013.01)

(58) Field of Classification Search

CPC . H01R 13/6587; H01R 13/516; H01R 12/716
USPC ....... 439/607.07, 607.13, 607.35, 493, 541.5
See application file for complete search history.

(56) References Cited

U.S. PATENT DOCUMENTS 4,948,379 A * 8/1990 Evans .................... H01R 12/79 439/493
5,577,935 A * 11/1996 Harting .................. H01R 24/50 439/578
5,709,554 A * 1/1998 Savage, Jr. ............ H01R 12/58 362/800
6,024,601 A * 2/2000 Hsu ...................... H01R 12/712 439/541.5
6,238,241 B1 * 5/2001 Zhu ...................... H01R 13/658 439/541.5
7,909,644 B1 * 3/2011 Li ........................ H01R 12/724 439/631
2004/0029438 A1 * 2/2004 Choy .................. H01R 12/712 439/541.5
2016/0172780 A1 6/2016 Tamai

FOREIGN PATENT DOCUMENTS

JP 2016-115487 A 6/2016

* cited by examiner

*Primary Examiner* — Gary F Paumen
(74) *Attorney, Agent, or Firm* — Howard & Howard Attorneys PLLC

(57) ABSTRACT

An electrical connector pair (1) includes: receptacle connectors (4) mounted on a mounting face (6*a*) of a board (6) and arrayed in a Y-axis direction along the mounting face (6*a*); and plug connectors (5) capable of mating with the receptacle connectors (4) on a one-to-one basis. The plug connectors (5) each include a projection (24*b*) projecting in the Y-axis direction in such a way as to partially overlap with an adjacent plug connector (5) of the plug connectors (5) when viewed from a Z-axis direction in which the receptacle connectors (4) mate with the plug connectors (5).

10 Claims, 17 Drawing Sheets

ELECTRICAL CONNECTOR PAIR

CROSS-REFERENCE TO RELATED APPLICATIONS

This application claims the benefit of Japanese Patent Application No. 2023-99862, filed on Jun. 19, 2023, the entire disclosure of which is incorporated by reference herein.

FIELD OF THE INVENTION

This application relates generally to an electrical connector pair.

BACKGROUND OF THE INVENTION

Unexamined Japanese Patent Application Publication No. 2016-115487 discloses a receptacle connector including receptacle-side connections linked by a receptacle-side linking member and a plug connector including plug-side connections linked by a plug-side linking member. After the receptacle connector mates with the plug connector, retentive force generated between a contact of the receptacle-side connection and a contact of the plug-side connection maintains the mating of the both connectors.

When a connector device including the receptacle connector and the plug connector disclosed in Unexamined Japanese Patent Application Publication No. 2016-115487 is subjected to an external shock or an unintended load, the mating of the receptacle connector and the plug connector may be released.

The present disclosure has been made in view of the above-described circumstance, and an objective of the present disclosure is to provide an electrical connector pair that can prevent mating of a receptacle connector and a plug connector from being easily released even when subjected to a shock or a load.

SUMMARY OF THE INVENTION

In order to achieve the above-described objective, an electrical connector pair according to the present disclosure includes: first connectors mounted on a mounting face of a board and arrayed in a first direction along the mounting face; and second connectors capable of mating with the first connectors on a one-to-one basis, wherein the second connectors each include a projection projecting in the first direction in such a way as to partially overlap with an adjacent second connector of the second connectors when viewed from a mating direction in which the first connectors mate with the second connectors.

The present disclosure can prevent mating of a receptacle connector and a plug connector from being easily released even when subjected to a shock or a load.

BRIEF DESCRIPTION OF DRAWINGS

A more complete understanding of this application can be obtained when the following detailed description is considered in conjunction with the following drawings, in which.

DETAILED DESCRIPTION OF THE INVENTION

Figure 1:
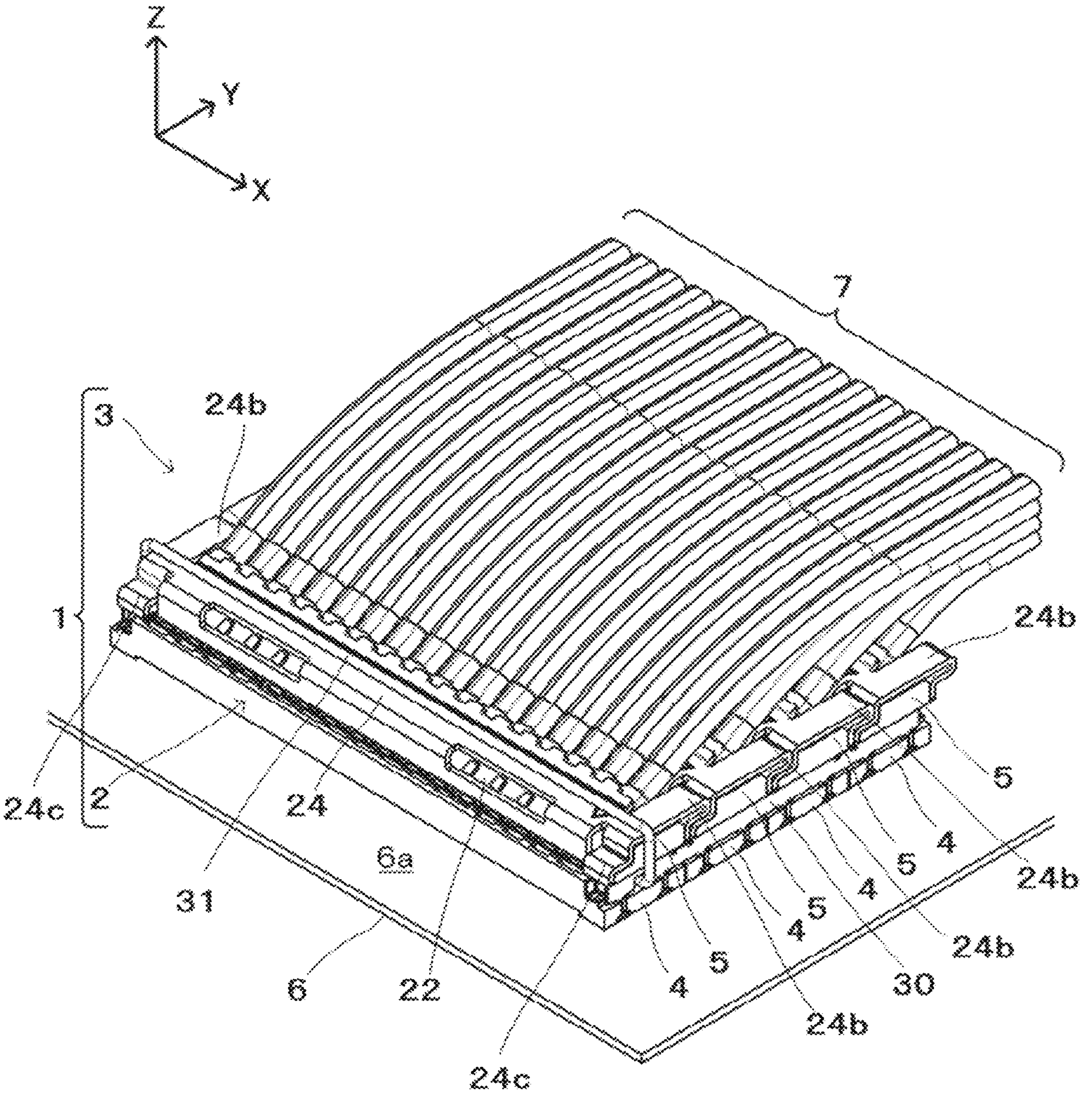
FIG. 1 is a perspective view illustrating an external appearance of an electrical connector pair according to Embodiment 1 of the present disclosure.

Hereinafter, embodiments of the present disclosure are described in detail with reference to drawings. In the drawings, the same or equivalent parts are denoted by the same reference signs. In the present embodiments, description is given as appropriate according to an XYZ three-axis orthogonal coordinate system represented in the drawings.

Embodiment 1

First, Embodiment 1 of the present disclosure is described.

[Electrical Connector Pair]

As illustrated in FIG. 1, an electrical connector pair 1 according to the present embodiment includes a connector linkage 2 and a connector array 3. The connector linkage 2 includes a plurality of receptacle connectors 4 arrayed in a linked state along a mounting face 6*a* of a board 6. The connector array 3 includes a plurality of plug connectors 5 arrayed in one direction. The receptacle connector 4 is mounted on the board 6, and the plug connector 5 is connected to a plurality of electrical cables 7.

In the present embodiment, description is given on an assumption that the mounting face 6*a* of the board 6 is parallel to an XY plane. Further, a Y-axis direction is defined as a first direction, and an X-axis direction is defined as a second direction.

The receptacle connectors 4 mate with the plug connectors 5 on a one-to-one basis. Thereby, the electrical connector pair 1 connects the board 6 to the plurality of electrical cables 7. When the receptacle connectors 4 mate with the plug connectors 5, the board 6 is electrically connected to the electrical cables 7, enabling signal transmission between an electrical circuit and an electronic component on the board 6 and the electrical cables 7. The electrical connector pair 1 is a pair of connectors having a multi-row connection structure in which the connector linkage 2 and the connector array 3 mate with each other.

[Board]

The board 6 is, for example, a printed wiring board or a flexible printed board on which an electrical circuit or an electronic component is mounted, and is accommodated in, for example, unillustrated electronic equipment. The receptacle connectors 4 included in the connector linkage 2 are connected, by solder connection or the like, to signal electrode patterns 6*b* and grounding electrode patterns 6*c* illustrated in FIG. 2 on the mounting face 6*a* of the board 6.

Figure 2:
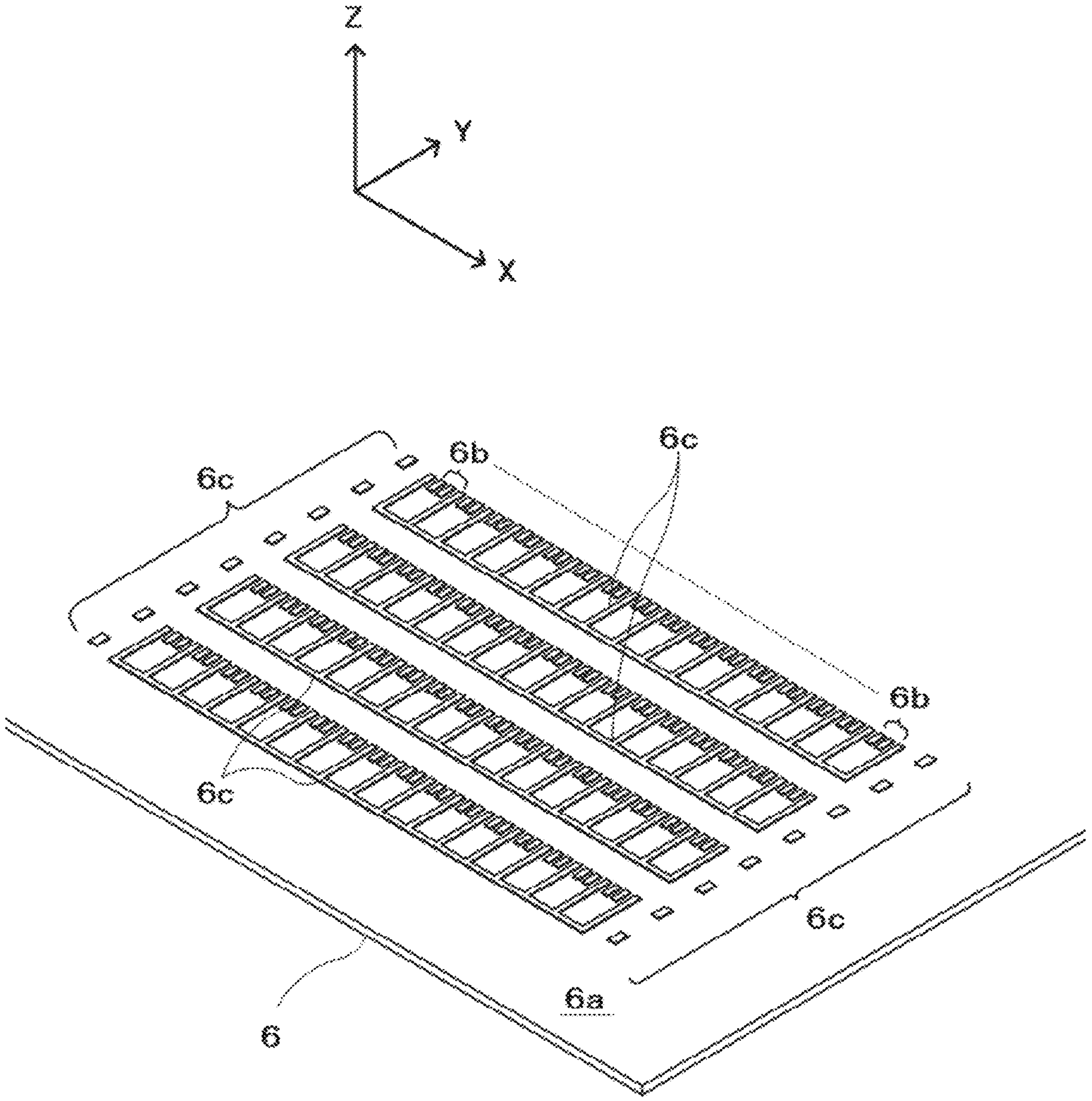
FIG. 2 is a view illustrating a foot pattern (electrical circuit) on a mounting face of a board.

As illustrated in FIG. 2, the signal electrode patterns 6*b* on the mounting face 6*a* of the board 6 are arrayed in the X-axis direction. Further, four rows of the signal electrode patterns 6*b* are arrayed in the Y-axis direction.

There are two patterns of the grounding electrode patterns 6*c*. One is a pattern having portions sandwiching a pair of signal electrode patterns 6*b* in the X-axis direction and a portion linking the portions in the X-axis direction. Another one includes a plurality of patterns arrayed in the Y-axis direction, in an area further outward than both ends in the X-axis direction of the arrays of the signal electrode patterns 6*b*.

In the present embodiment, it is assumed that the mounting face 6*a* of the board 6 is parallel to the XY plane. Accordingly, a normal direction of the mounting face 6*a* is a Z-axis direction. In the present embodiment, description is given as appropriate on an assumption that a plane parallel to the XY plane is defined as a “horizontal plane”, a +Z direction is defined as an “upward” direction, and a-Z direction is defined as a “downward” direction.

[Electrical Cable]

Figure 3:
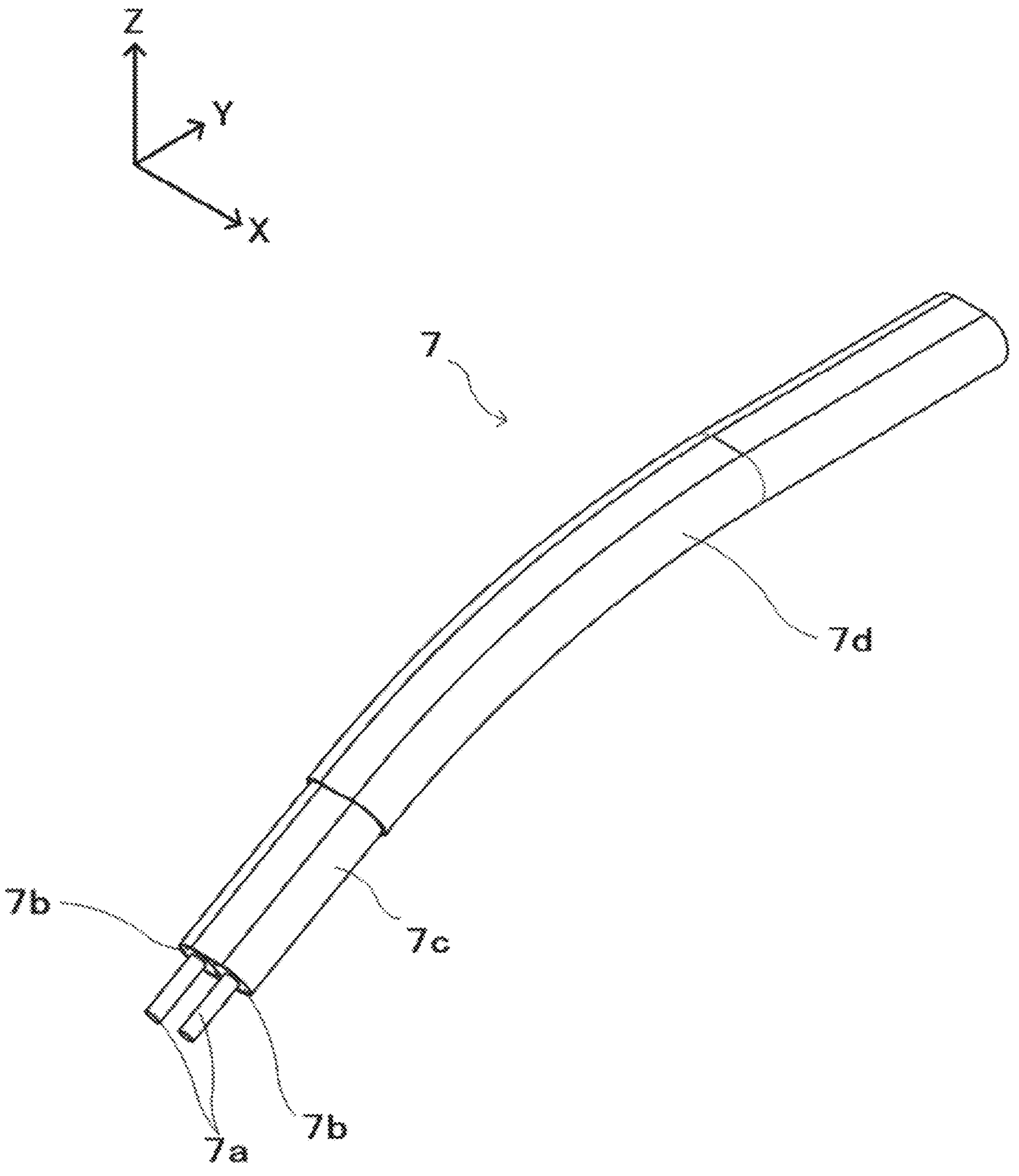
FIG. 3 is a perspective view illustrating an end of a coaxial cable.

The electrical cable 7 is used for, for example, transmitting an electrical signal between the board 6 accommodated in electronic equipment and another board. In the present embodiment, the electrical cable 7 is a two-core flat coaxial cable. As illustrated in FIG. 3, the electrical cable 7 includes a pair of inner conductors 7*a*, an insulator 7*b*, an outer conductor 7*c*, and a protective film 7*d*. The pair of inner conductors 7*a* are linearly extending metal wires (for example, copper wires). The insulator 7*b* covers a circumferential face of each inner conductor 7*a* in an insulated state. The outer conductor 7*c* is a metal braided wire, and covers a circumference of each inner conductor 7*a* over the insulator 7*b*. The protective film 7*d* covers a circumferential face of the outer conductor 7*c*. The electrical cable 7 enables signal transmission using a potential difference between the two inner conductors 7*a* and the outer conductor 7*c*. The electrical cable 7 is connected to the plug connector 5 in a state arrayed in the X-axis direction.

Note that, the above-described electrical cable 7 is merely for illustrative purpose. For example, the inner conductor 7*a* may be a stranded wire including a plurality of metal wires, or may be a single metal wire. Further, the outer conductor 7*c* may be a single wound copper sheet, rather than a metal braided wire.

As illustrated in FIG. 1, the receptacle connectors 4 included in the connector linkage 2 and the plug connectors 5 included in the connector array 3 are configured in a way capable of mating with and being extracted from each other along the normal direction (Z-axis direction) of the mounting face 6*a* of the board 6.

[Connector Linkage]

A configuration of the connector linkage 2 is described. First, a detailed configuration of the individual receptacle connector 4 included in the connector linkage 2 is described.

[Receptacle Connector]

Figure 4:
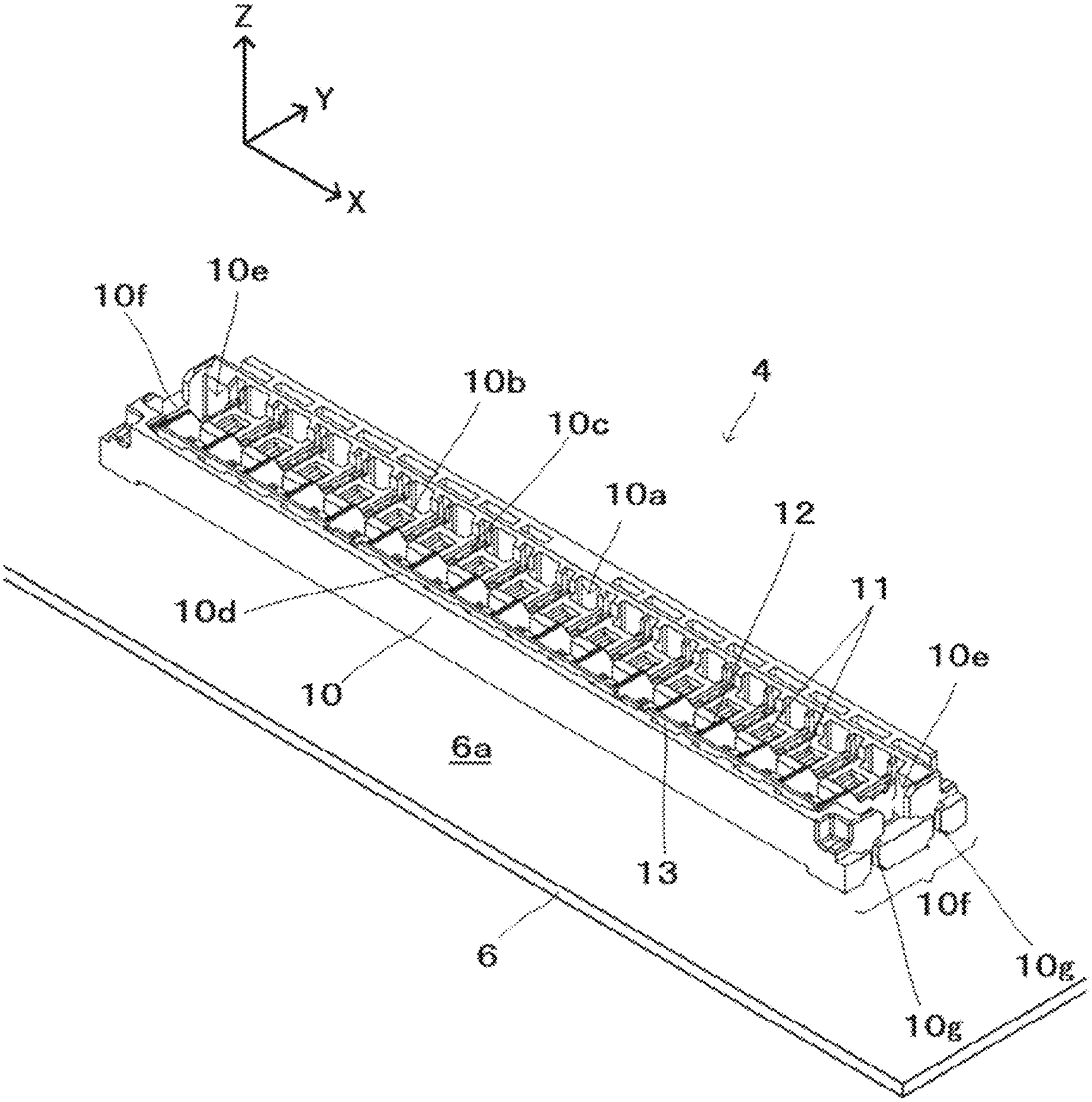
FIG. 4 is a perspective view illustrating an external appearance of a receptacle connector.

As illustrated in FIG. 4, the receptacle connector 4 as a whole is a plate-shaped connector with a long length in the X-axis direction.

Figure 5:
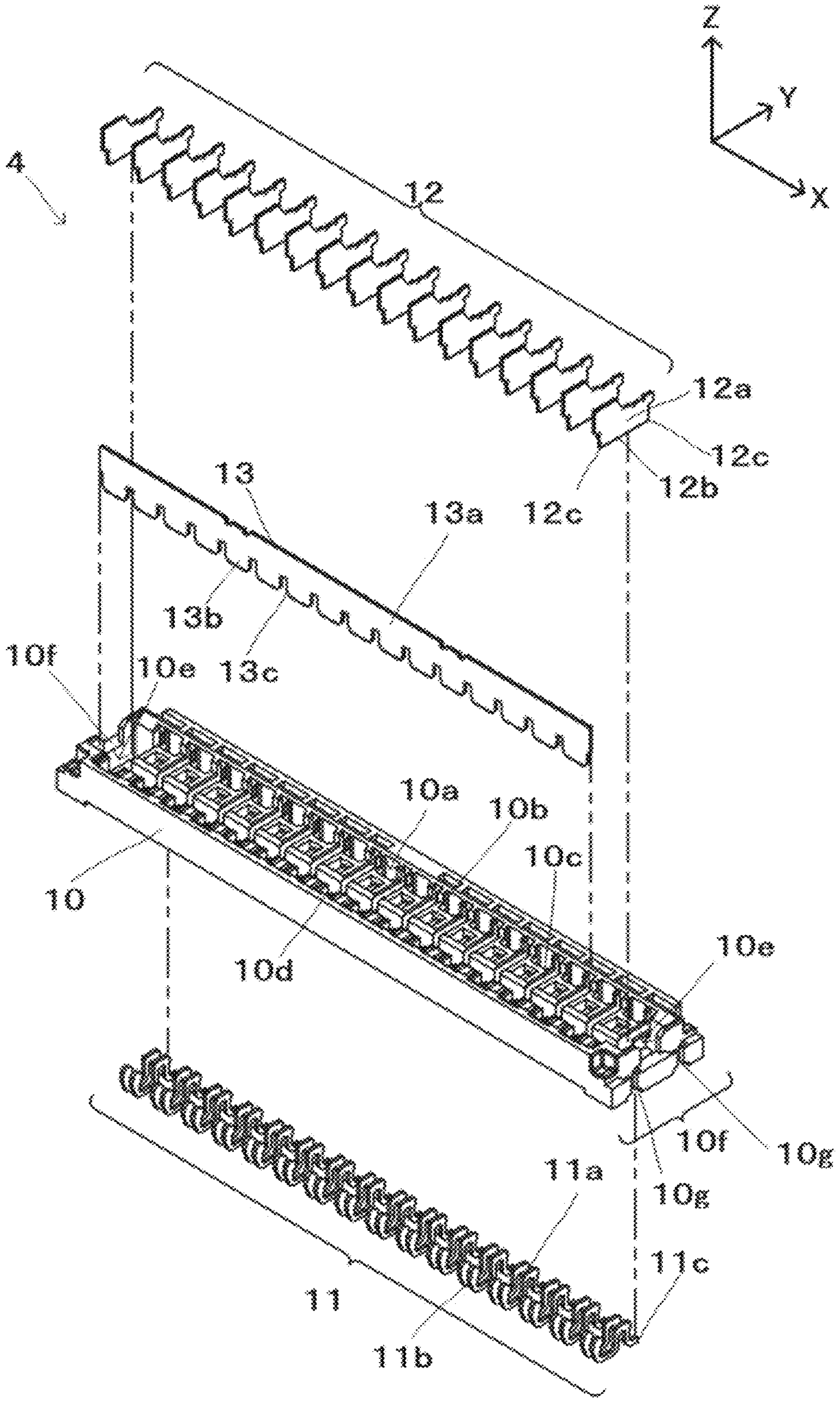
FIG. 5 is an exploded perspective view of the receptacle connector illustrated in FIG. 4.

As illustrated in FIG. 5, the receptacle connector 4 includes a receptacle housing 10 facing the mounting face 6*a* of the board 6, a plurality of receptacle terminals 11 for signal transmission, shield plates 12 functioning as electromagnetic shields, and a ground plate 13 functioning as an electromagnetic shield similarly.

[Receptacle Housing]

As illustrated in FIG. 5, the receptacle housing 10 is a mother body of the receptacle connector 4. The receptacle housing 10 has a rectangular outer shape, and is long in the X-axis direction. The receptacle housing 10 is a member molded from an insulating material containing resin.

The receptacle housing 10 is provided with a recess 10*a* on a top face facing in the +Z direction. The recess 10*a* has an opening extending in the X-axis direction in which the receptacle housing 10 is long. The recess 10*a* is provided with a mating recess 10*e* at both ends in the X-axis direction. The mating recess 10*e* mates with a mating protrusion 20*c* of a plug housing 20 to be described later.

Further, the recess 10*a* is provided with a plurality of contact press-fit parts 10*b*, a plurality of shield plate press-fit parts 10*c*, and a ground plate press-fit part 10*d*. The contact press-fit parts 10*b* are grooves arrayed in the X-axis direction at fixed intervals. A pair of receptacle terminals 11 are press-fitted from below into each contact press-fit part 10*b*. The shield plate press-fit parts 10*c* are grooves provided on both sides in the X-axis direction of each contact press-fit part 10*b*. The shield plates 12 are press-fitted from up into the shield plate press-fit parts 10*c*. The ground plate press-fit part 10*d* is a groove extending in the X-axis direction at a-Y direction position when viewed from the contact press-fit parts 10*b* and the shield plate press-fit parts 10*c*. The ground plate 13 is press-fitted from up into the ground plate press-fit part 10*d*.

The receptacle housing 10 holds the plurality of receptacle terminals 11 placed in parallel in the X-axis direction, the plurality of shield plates 12, and the ground plate 13. The receptacle housing 10 is interposed between the receptacle terminals 11 and the shield plates 12 and the ground plate 13, and insulates the receptacle terminals 11 and the shield plates 12 and the ground plate 13 from each other.

[Receptacle Terminal]

The plurality of receptacle terminals 11 is, for example, an elastic and conductive member acquired by punching a metallic plate-shaped member. As illustrated in FIG. 5, the receptacle terminal 11 is provided with a fixing part 11*a*, a receptacle contact part 11*b*, and a board connecting part 11*c*. The receptacle terminals 11 are thick in the X-axis direction, and, in a state aligned in the same orientation, the fixing parts 11*a* thereof are put into the contact press-fit parts 10*b* from down to up. Thereby, the receptacle terminals 11 are fixed to and held by the receptacle housing 10.

When the receptacle terminals 11 are fixed to the receptacle housing 10, the receptacle contact parts 11*b* are brought into a state of projecting within the recess 10*a* of the receptacle housing 10. Further, when the receptacle terminals 11 are fixed to the receptacle housing 10, the board connecting parts 11*c* are brought into a state of being arrayed in the X-axis direction along the mounting face 6*a* of the board 6. The board connecting parts 11*c* are positioned above the signal electrode patterns 6*b* (see FIG. 2), and are connected thereto. The receptacle terminals 11 are connected to the signal electrode patterns 6*b* (see FIG. 2) on the mounting face 6*a*, make contact with plug terminals 21 of the plug connector 5, and are arrayed in a row in the same orientation along the mounting face 6*a*, and a pair of adjacent receptacle terminals 11 as a set transmits a differential signal.

[Shield Plate]

The plurality of shield plates 12 is, for example, a conductive member acquired by punching a metallic plate-shaped member. As illustrated in FIG. 5, the shield plate 12 is provided with a body 12*a* and a board connecting part 12*b*. As illustrated in FIG. 5, the shield plates 12 are thick in the X-axis direction, and, in a state aligned in the same orientation, are press-fitted into the shield plate press-fit parts 10*c* from up to down with the board connecting parts 12*b* placed down. The board connecting parts 12*b* are positioned above the grounding electrode patterns 6*c* (see FIG. 2), and are connected thereto by soldering. Note that, the shield plate 12 is provided with a protruding shield plate press-fit part 12*c* at both ends in the Y-axis direction of the board connecting part 12*b*.

[Ground Plate]

The ground plate 13 is, for example, a conductive member acquired by punching a metallic plate-shaped member. As illustrated in FIG. 5, the ground plate 13 is provided with a body 13*a* and a board connecting part 13*b*. The ground plate 13 is thick in the Y-axis direction, and, in a state extending in the X-axis direction, are press-fitted into the ground plate press-fit parts 10*d* from up to down with the board connecting parts 13*b* placed down. The board connecting parts 13*b* are positioned above the grounding electrode patterns 6*c* (see FIG. 2). Note that, the ground plate 13 is provided with a protruding ground plate press-fit part 13*c* between the board connecting parts 13*b* arrayed in the X-axis direction.

The four receptacle connectors 4 having the functions described above are mounted on the mounting face 6*a* of the board 6, and are arrayed in the Y-axis direction (first direction) along the mounting face 6*a*.

[Linking Part]

Figure 6A:
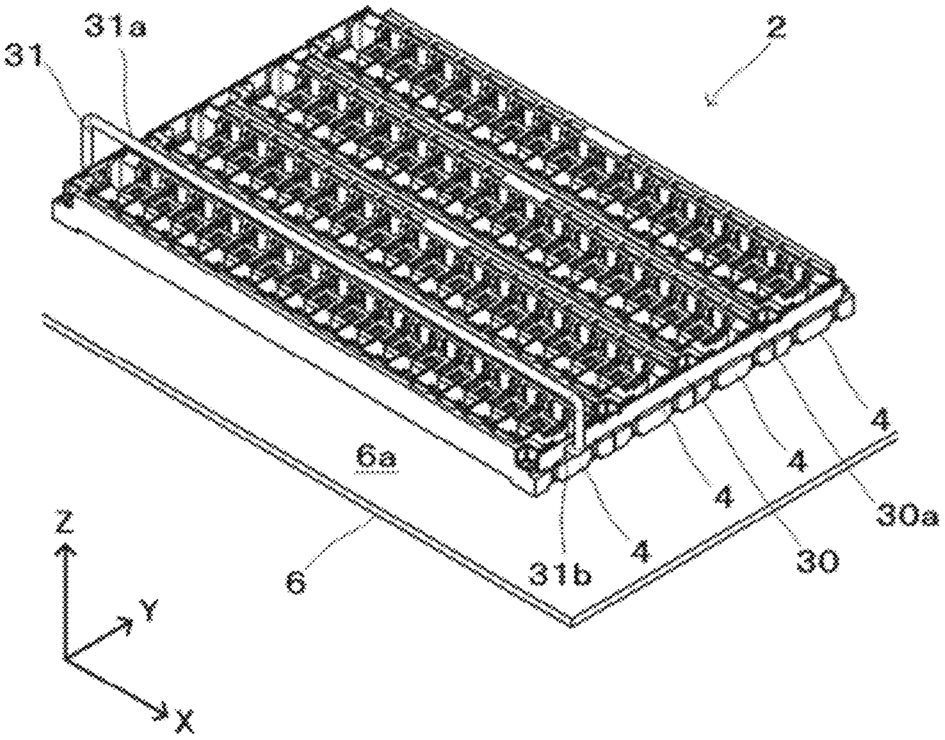
FIG. 6A is a perspective view of a connector linkage.
Figure 6B:
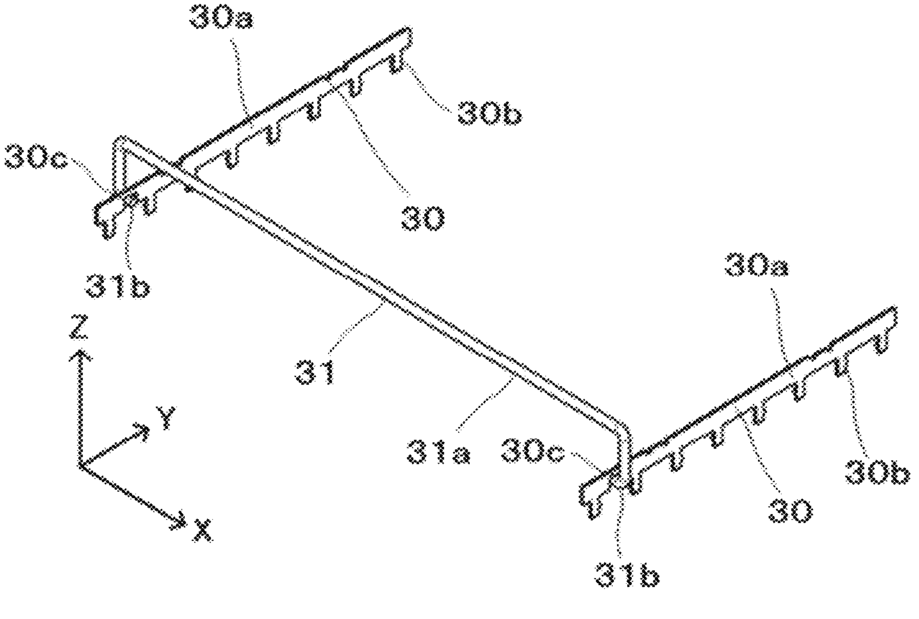
FIG. 6B is a perspective view illustrating a partial structure of the connector linkage.

As illustrated in FIGS. 6A and 6B, the plurality of receptacle connectors 4 is linked by a linking part 30 at both ends in the X-axis direction thereof. The linking part 30 is a conductive member acquired by punching a metallic plate-shaped member. The linking part 30 includes a body 30*a* extending in the Y-axis direction (first direction), a plurality of extensions 30*b* extending downward from the body 30*a*, and a shaft support 30*c* supporting a rotating shaft of a first locking part 31 to be described later.

As illustrated in FIGS. 6A and 6B, a length of the body 30*a* in the Y-axis direction (first direction) is the same as a length of an array of the four receptacle connectors 4. As illustrated in FIG. 5, the receptacle housing 10 is provided with, on a lower part at both ends in the X-axis direction, a protrusion 10*f* protruding outward along the X-axis direction. The protrusion 10*f* has a horizontal top face, on which the body 30*a* is mounted.

As illustrated in FIG. 6B, the extensions 30*b* extending downward are on a lower edge of the body 30*a*. The extensions 30*b* are present at fixed intervals in the Y-axis direction. As illustrated in FIG. 5, the receptacle housing 10 is provided with receiving parts 10*g* receiving the extensions 30*b*. When the extensions 30*b* are put into the receiving parts 10*g* and are press-fitted, the body 30*a* is brought into a state of being placed on the top face of the protrusion 10*f*. Thereby, the linking part 30 links the plurality of receptacle connectors 4 to one another. A lower end of the extension 30*b* is connected to the grounding electrode pattern 6*c* (see FIG. 2) on the mounting face 6*a* of the board 6.

[Shaft Support]

As illustrated in FIG. 6B, the body 30*a* has the shaft support 30*c*. The shaft support 30*c* is a notch on the lower edge of the body 30*a*.

[First Locking Part]

As illustrated in FIG. 6A, the connector linkage 2 includes the first locking part 31. The first locking part 31 is, for example, acquired by bending an elongated cylindrical member. The first locking part 31 includes a body 31*a* and a rotating shaft 31*b*. The body 31*a* extends in the X-axis direction, and has a length exceeding the length in the X-axis direction of the receptacle connector 4. The rotating shaft 31*b* is at both ends of the body 31*a*. The rotating shaft 31*b* is bent in two steps relative to the body 31*a*, and is put between the shaft support 30*c* and the protrusion 10*f* of the receptacle housing 10 in a supported way. The first locking part 31 is rotatable about an axis parallel to the X axis by rotation of the rotating shaft 31*b*.

In the present embodiment, the four receptacle connectors 4 are arrayed in the Y-axis direction and are linked to one another by the linking part 30, thereby constituting the connector linkage 2.

[Plug Connector]

Next, the plug connector 5 mating with the receptacle connector 4 on a one-to-one basis is described. As illustrated in FIGS. 7 to 12, the plug connector 5 includes the plug housing 20 (see FIG. 8) as a mother body, the plurality of plug terminals 21 (FIG. 9A) as a signal transmission path, a plurality of first shells 22 (see FIG. 11) functioning as an electromagnetic shield between the plug terminal 21 and outside, a second shell 23 (see FIG. 12A) functioning as an electromagnetic shield similarly, and a third shell 24 (see FIG. 7) strengthening rigidity of the plug connector 5. Note that, FIGS. 7 to 12 illustrate XYZ coordinate systems when the plug connector 5 mates with the receptacle connector 4.

[Plug Housing and Plug Terminal]

Figure 8:
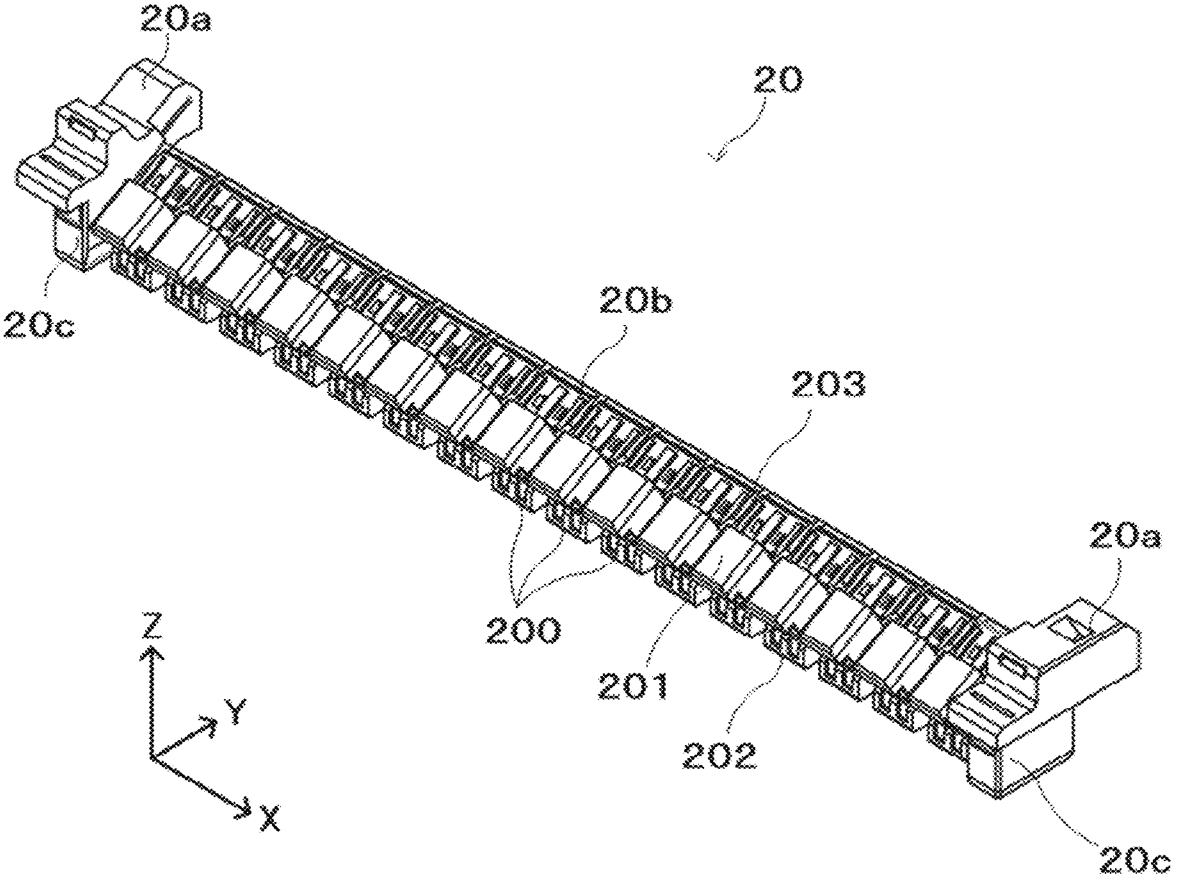
FIG. 8 is a perspective view of a plug housing constituting the plug connector.
Figure 9A:
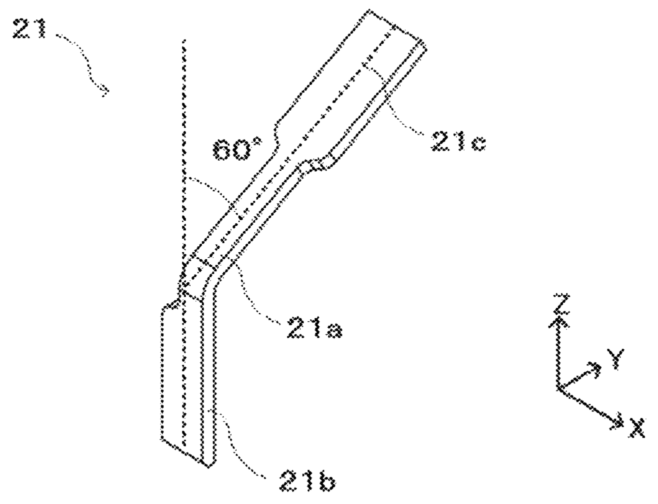
FIG. 9A is a perspective view of a plug terminal constituting the plug connector.
Figure 9B:
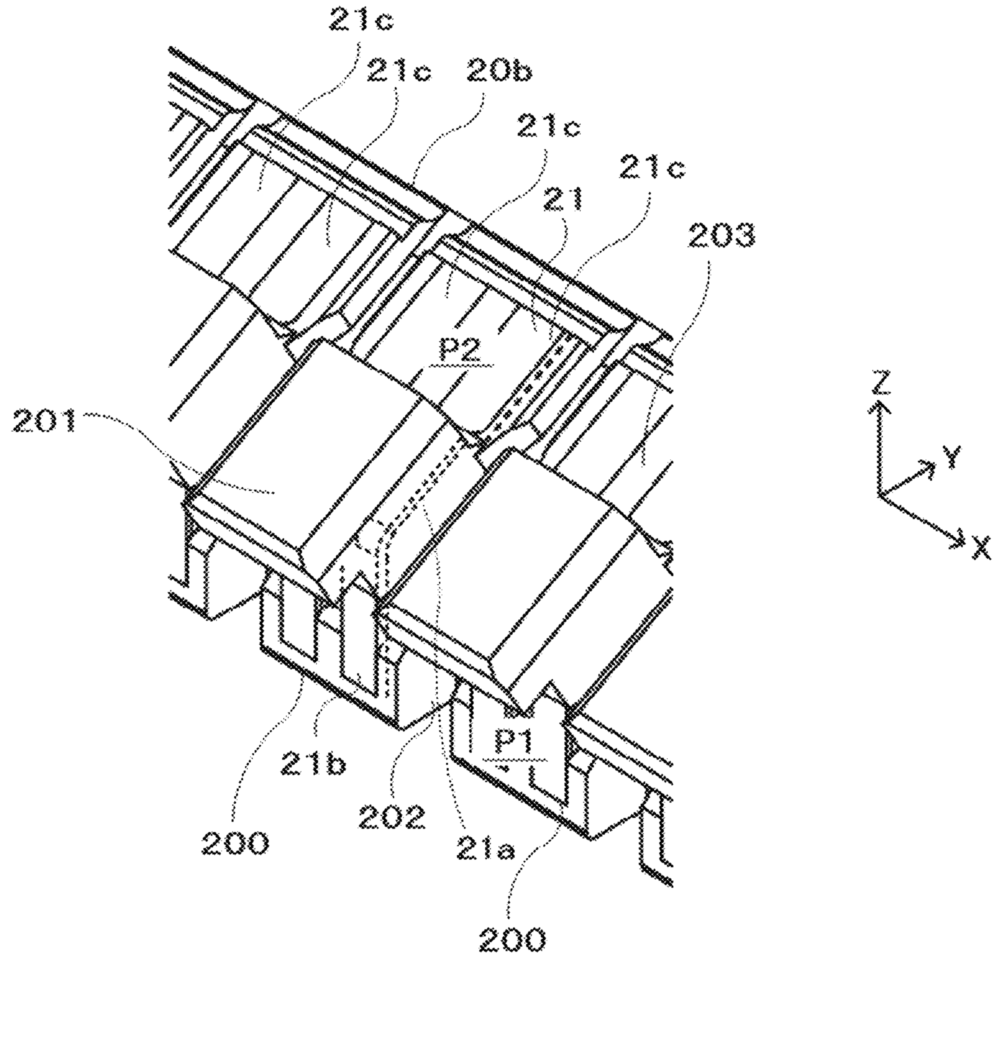
FIG. 9B is a partial perspective view of the plug housing to which the plug terminal is attached.
Figure 10:
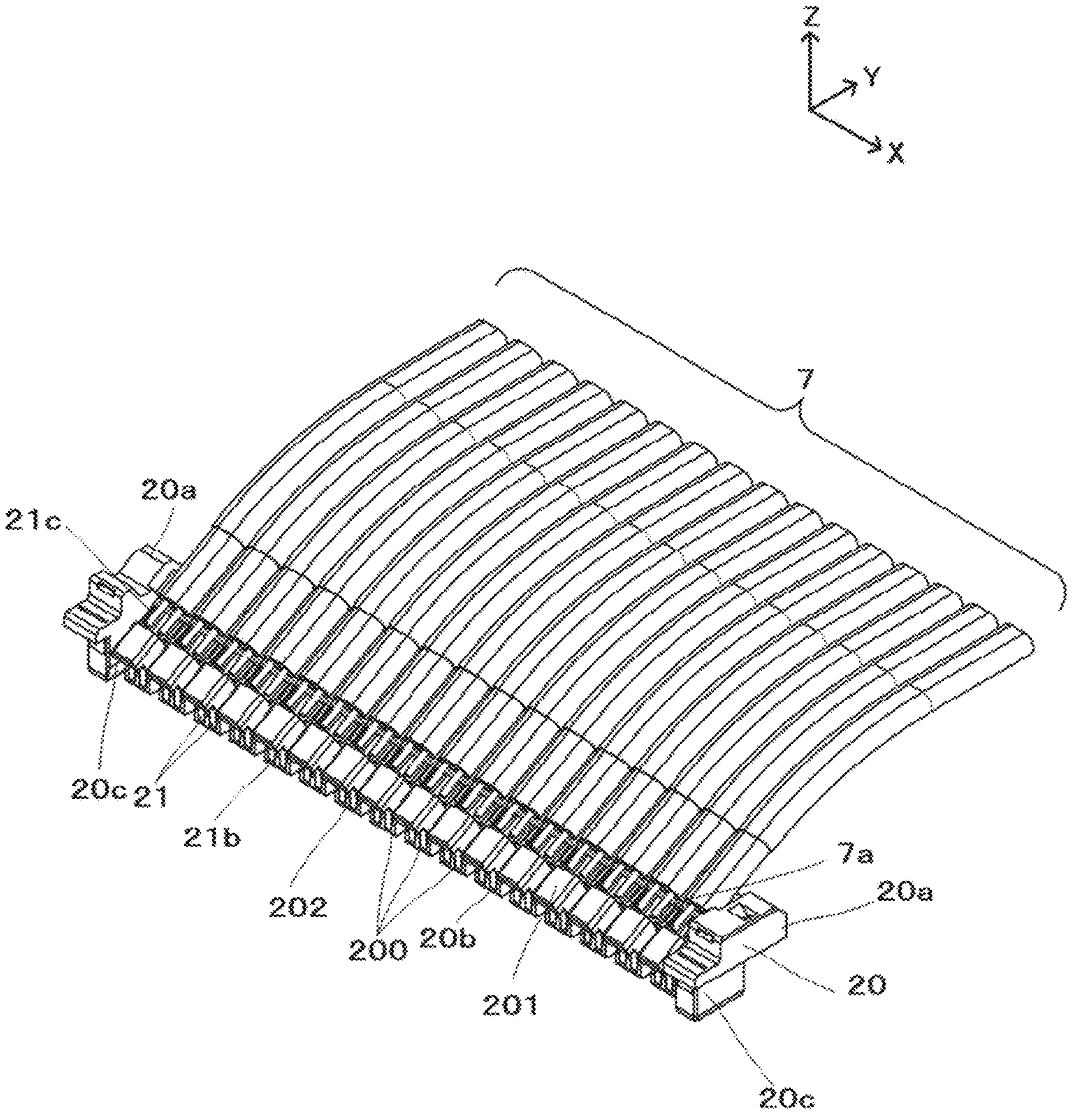
FIG. 10 is a perspective view illustrating a state in which an electrical cable is connected to the plug housing and the plug terminal.
Figure 11:
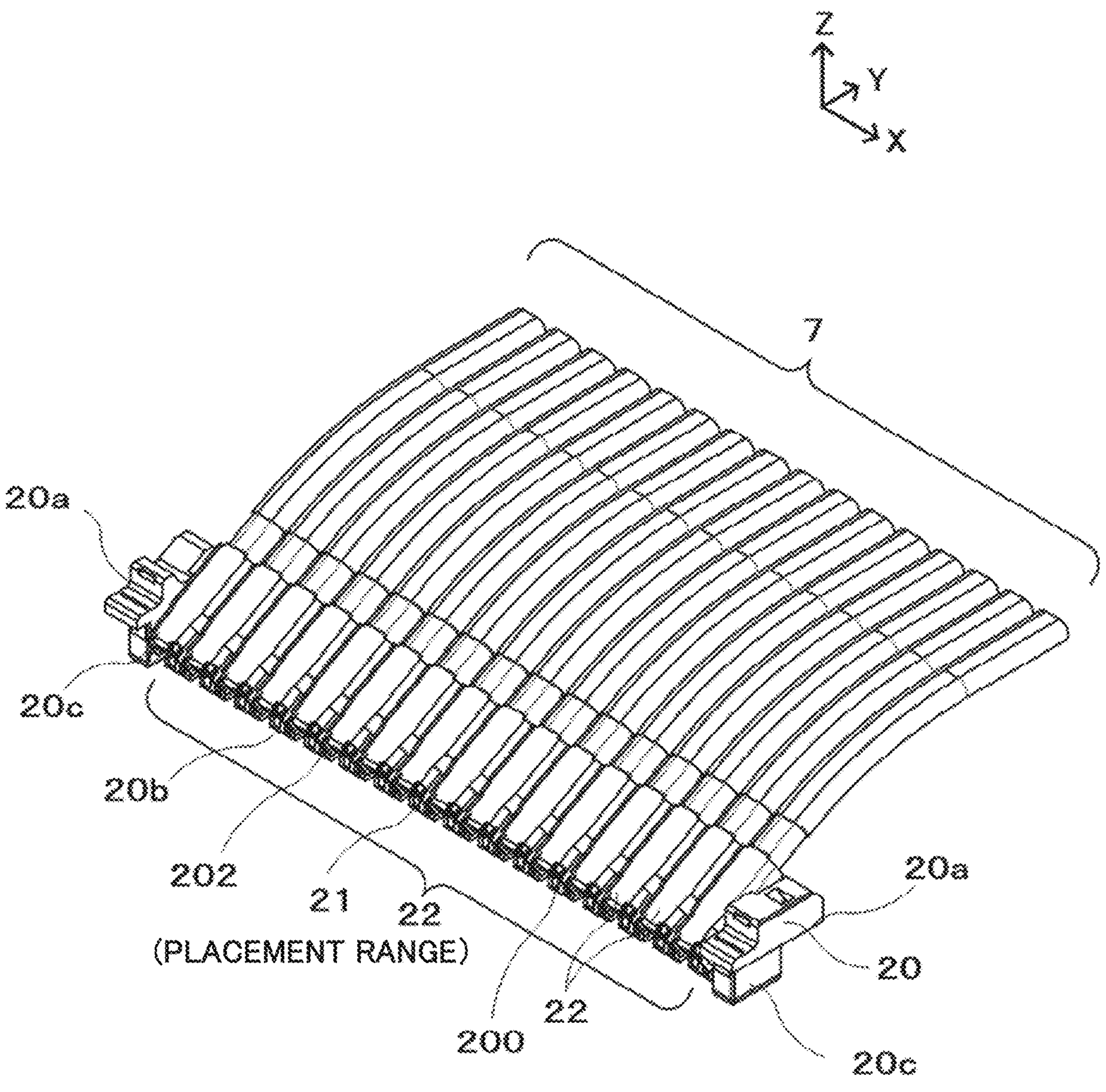
FIG. 11 is a perspective view illustrating a state in which a first shell is attached to a configuration of the plug housing, the plug terminal, and the electrical cable.

The plug housing 20 is, for example, a resinous insulating member. As illustrated in FIG. 8, the plug housing 20 as a whole is a member with a long length in the X-axis direction. The plug housing 20 is provided with, at both ends in the X-axis direction, cover connecting parts 20*a* connecting to the third shell 24 to be described later. Further, as illustrated in FIG. 11, a plug array part 20*b* in which the plurality of plug terminals 21 is arrayed is provided between the both cover connecting parts 20*a*. As illustrated in FIG. 10, the plug array part 20*b* holds the plurality of plug terminals 21 (see FIG. 9A) in a state arrayed in one direction in the same orientation. As illustrated in FIG. 9B, the plug array part 20*b* is constituted by linking, in the X-axis direction, a plurality of plug mounting parts 200 on which a pair of plug terminals 21 is placed. As illustrated in FIG. 8, the plug housing 20 is provided with, at both ends in the X-axis direction, the convex mating protrusion 20*c* extending in the −Z direction. The mating protrusion 20*c* mates with the mating recess 10*e* of the receptacle housing 10.

The plug terminal 21 is acquired by punching, for example, a metallic plate-shaped conductive member. As illustrated in FIGS. 9A and 9B, the plug terminal 21 includes a fixing part 21*a* fixed to the plug housing 20, a plug contact part 21*b* making contact with the conductive receptacle terminal 11 of the receptacle connector 4 on a one-to-one basis, and a cable connecting part 21*c* connecting to the inner conductor 7*a* of the electrical cable 7. The fixing part 21*a* is provided at a center of the plug terminal 21. The plug contact part 21*b* extends in a downward direction (−Z direction) from the fixing part 21*a*, and the cable connecting part 21*c* extends in a direction inclined at 60° in the Y-axis direction relative to an upward direction (+Z direction) along a YZ plane. The plug contact part 21*b* makes contact with the receptacle terminal 11 at a portion along the mating direction (Z-axis direction) while mating with the receptacle connector 4. The cable connecting part 21*c* has an inclined portion to which the inner conductor 7*a* of the electrical cable 7 extending along an inclination direction is connected.

As illustrated in FIG. 9B, the fixing part 21*a* is embedded in the plug mounting part 200. The plug contact part 21*b* extends in the Z-axis direction, and makes contact with the receptacle contact part 11*b* (see FIG. 5) of the receptacle terminal 11 as described later. The cable connecting part 21*c* extends in an inclination direction inclined from the +Z direction toward the +Y direction along the YZ plane, and is connected to the inner conductor 7*a* of the electrical cable 7 by soldering.

As illustrated in FIG. 8, the plug mounting part 200 constituting the plug housing 20 includes a terminal fixing part 201, a mating part 202, and a supporting part 203. At least a part between the plug contact part 21*b* and the cable connecting part 21*c* of the plug terminal 21, that is, the fixing part 21*a*, is fixed to the terminal fixing part 201 of the plug housing 20.

As illustrated in FIG. 9B, the mating part 202 mates with the recess 10*a* (see FIG. 4) of the receptacle connector 4 in a vertical direction, and includes a first plug face P1 extending in the mating direction (Z-axis direction) and the array direction (X-axis direction) of the plug terminals 21. The plug contact part 21*b* is exposed on the first plug face P1. The supporting part 203 is linked to the mating part 202, and includes a second plug face P2 extending in the above-described inclination direction in which the cable connecting part 21*c* of the plug terminal 21 extends and the array direction (X-axis direction) of the plug terminals 21. The cable connecting part 21*c* is exposed on the second plug face P2. As illustrated in FIG. 10, the plurality of electrical cables 7 is connected to the plug connector 5, and a pair of mutually adjacent plug terminals 21 as a set transmits a differential signal.

[First Shell]

As illustrated in FIG. 11, the first shell 22 is a conductive member acquired by punching and bending a metallic plate-shaped member. As can be seen from comparison of FIGS. 10 and 11, the first shell 22 is provided for each set of a pair of plug terminals 21 in an insulated state from the plug terminal 21 due to projection of the terminal fixing part 201. The first shell 22 covers a portion of the plug terminal 21 excluding the plug contact part 21*b* and the cable connecting part 21*c*.

[Second Shell]

Figure 12A:
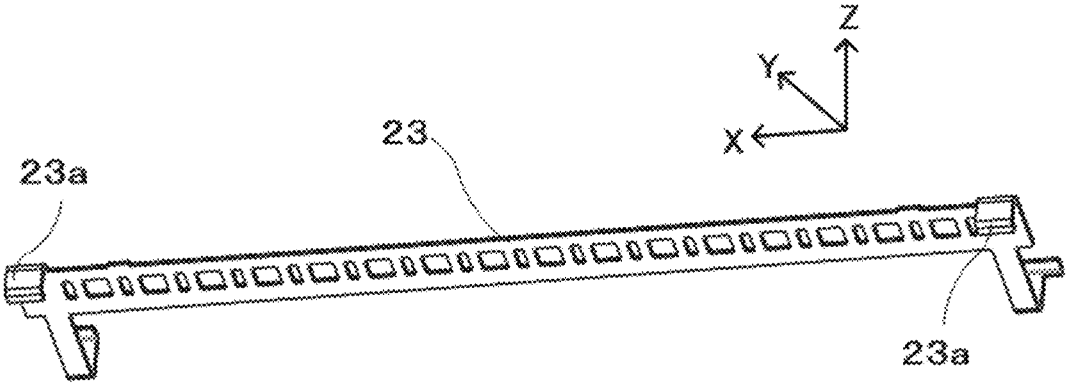
FIG. 12A is a perspective view of a second shell.
Figure 12B:
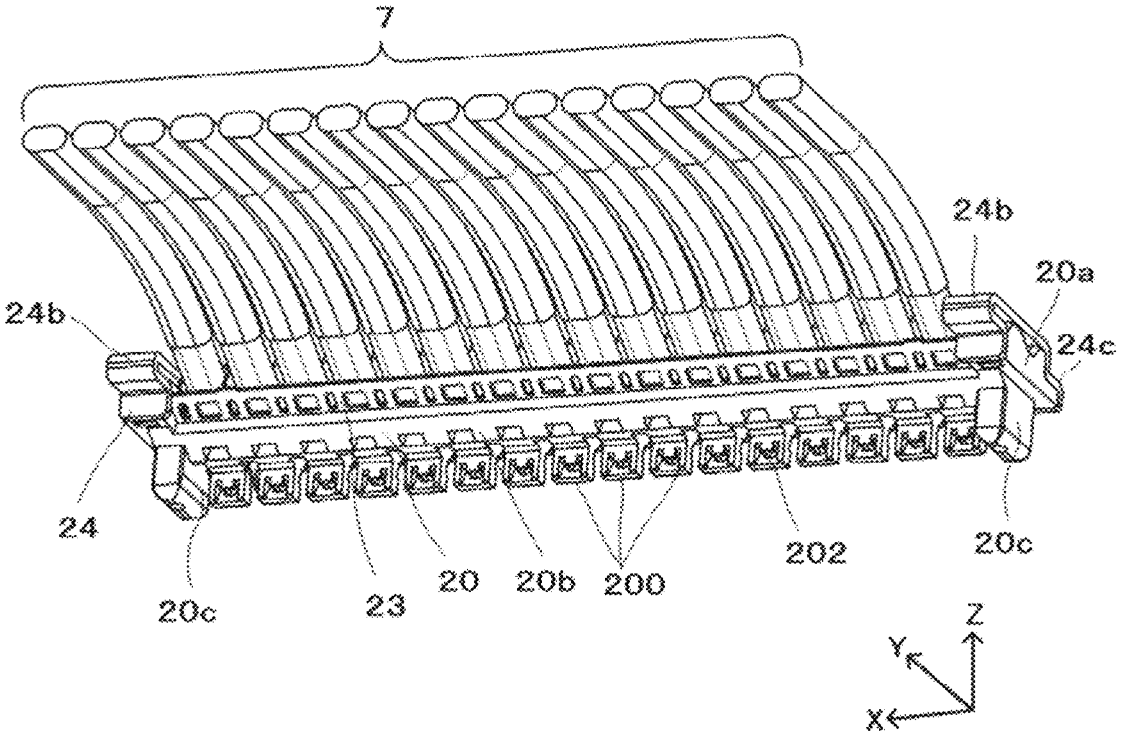
FIG. 12B is a perspective view illustrating a state in which the second shell is attached to a configuration of the plug housing, the plug terminal, the electrical cable, and the first shell.

As illustrated in FIGS. 12A and 12B, the second shell 23 is a conductive member acquired by punching and bending a metallic plate-shaped member. The second shell 23 extends in the inclination direction in which the cable connecting part 21*c* extends and the array direction (X-axis direction) of the plug terminals 21, and covers the plurality of plug terminals 21 from an opposite side of the first shell 22 relative to the cable connecting part 21*c*.

[Third Shell]

Figure 7:
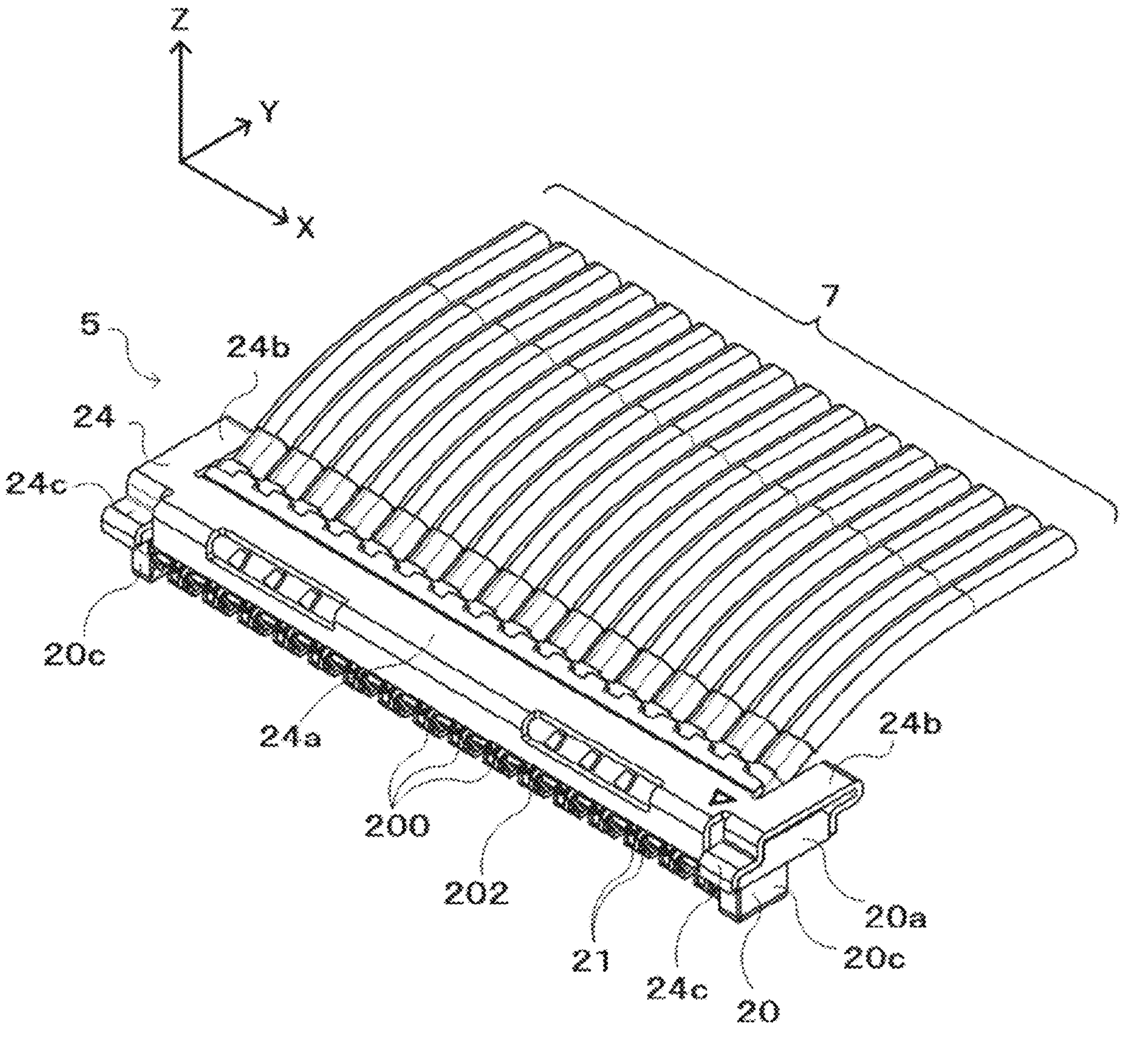
FIG. 7 is a perspective view illustrating an external appearance of a plug connector.

As illustrated in FIG. 7, the third shell 24 is a conductive member acquired by punching and bending a metallic plate-shaped member. The third shell 24 is a cover member with a body 24*a* covering the plurality of plug terminals 21 from above the first shell 22. As described above, the third shell 24 is fixed to the cover connecting parts 20*a* provided at both ends in the X-axis direction of the plug housing 20.

In the plug connector 5, the first shell 22, the second shell 23, and the third shell 24 make contact with one another and are grounded, thereby achieving an electromagnetic shield that covers at least a part of an outer periphery of the plug housing 20 in an insulated state from a pair of plug terminals 21. Specifically, as illustrated in FIG. 12A, extensions 23*a* at both ends in the X-axis direction of the second shell 23 make contact with the third shell 24.

As illustrated in FIG. 7, the third shell 24 is provided with, at both ends in the X-axis direction, a projection 24*b* and a step 24*c*. The projection 24*b* is provided at a portion of both ends in the X-axis direction closer to +Y, and projects in the +Y direction. The step 24*c* is a recess provided in a pair with the projection 24*b*, and has a size as large as the projection 24*b* can fit.

[Mating of Receptacle Connector and Plug Connector]

Figure 13:
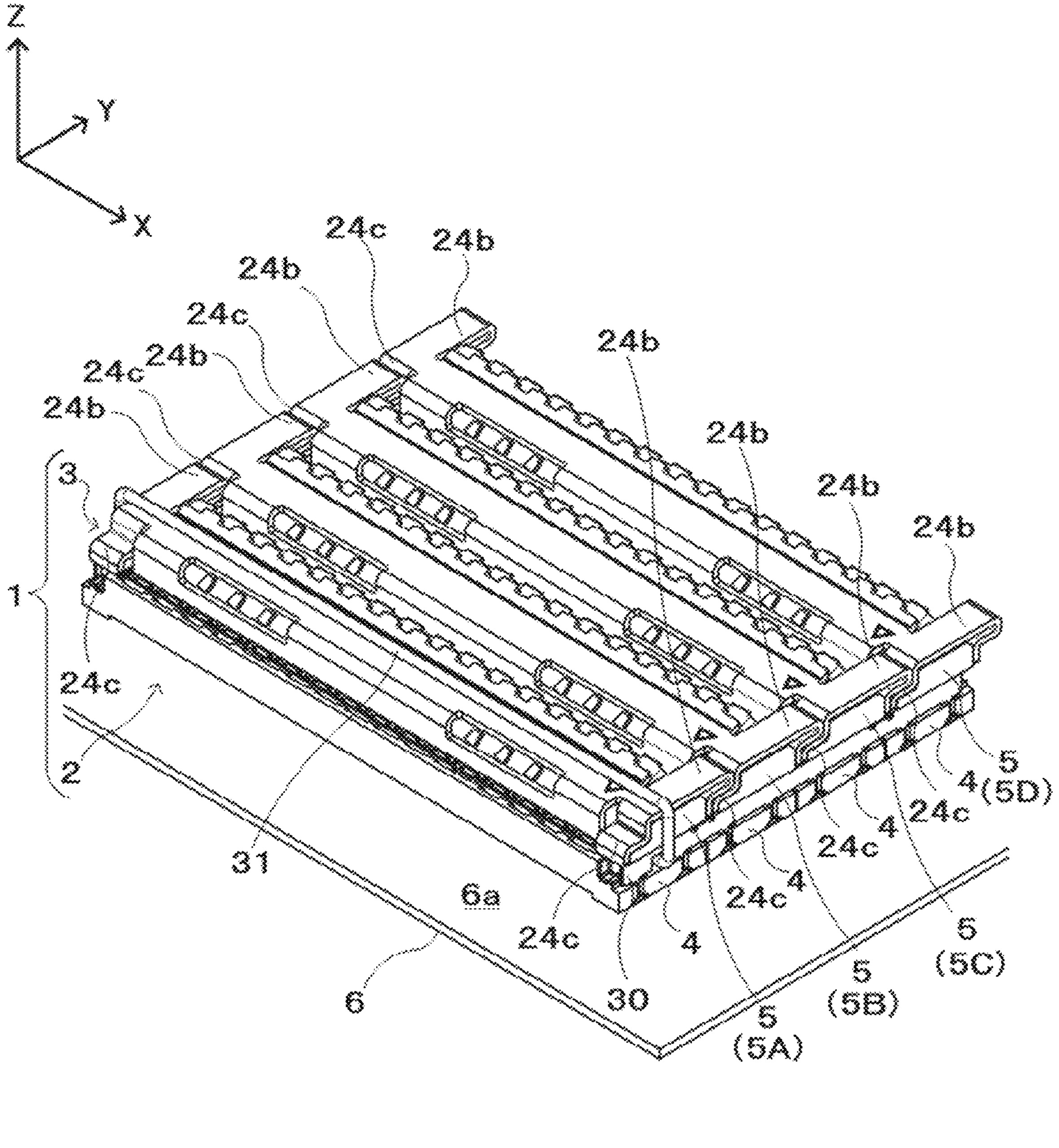
FIG. 13 is a perspective view of the electrical connector pair from which the electrical cable is omitted.

As illustrated in FIG. 13, the connector linkage 2 mates with the connector array 3 in the electrical connector pair 1. In FIG. 13, the electrical cables 7 are not illustrated. As illustrated in FIG. 6A, the four receptacle connectors 4 in the connector linkage 2 are arrayed in the Y-axis direction in a linked state by the linking part 30. As illustrated in FIG. 13, among the four plug connectors 5 in the connector array 3, the plug connector 5 that is closest to +Y in the direction in which the electrical cables 7 extend mates in turn with the receptacle connector 4. Herein, the plug connector 5 closest to −Y is defined as a plug connector 5A, the plug connector 5 adjacent to the plug connector 5A is defined as a plug connector 5B, the plug connector 5 adjacent to the plug connector 5B is defined as a plug connector 5C, and the plug connector 5 adjacent to the plug connector 5C is defined as a plug connector 5D.

Figure 14:
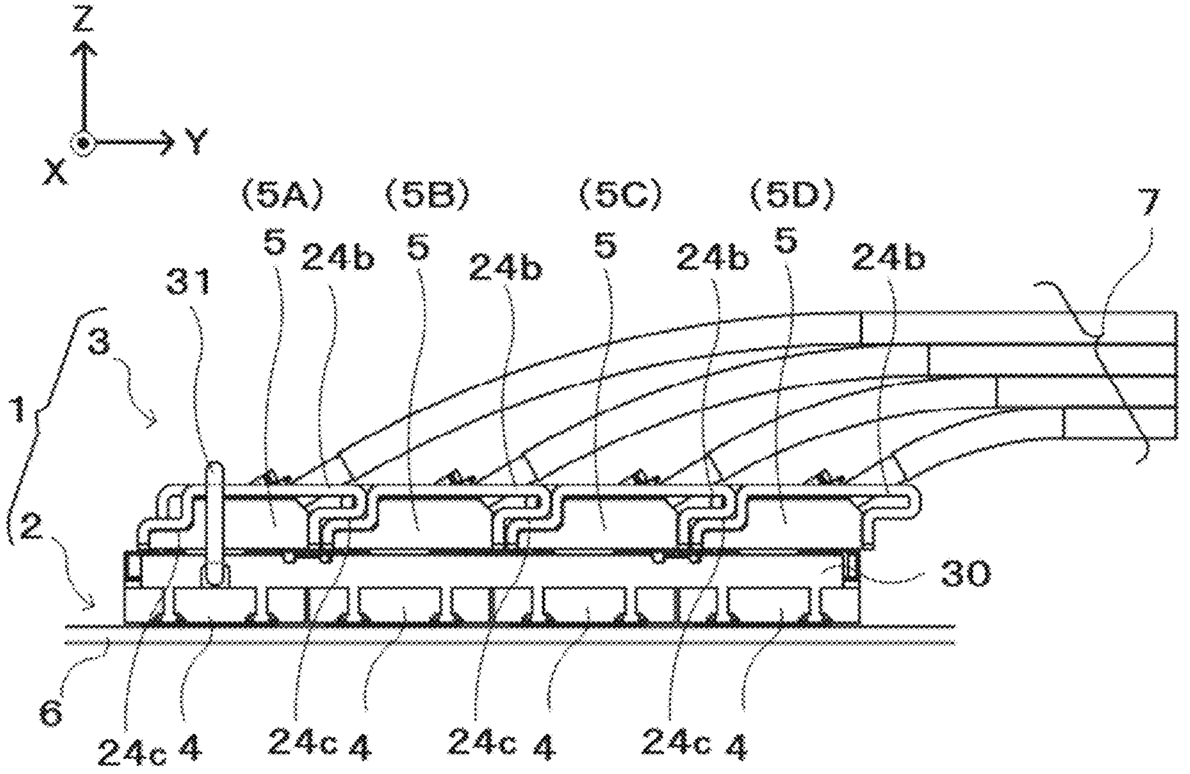
FIG. 14 is a side view of the electrical connector pair.

As illustrated in FIGS. 13 and 14, the projection 24*b* of the plug connector 5 projects in the +Y direction in such a way as to partially overlap with the adjacent plug connector 5 when viewed from the mating direction in which the receptacle connector 4 mates with the plug connector 5. The projection 24*b* fits into the step 24*c* of the adjacent plug connector 5. Further, the plug connector 5A closest to −Y, that is, the plug connector 5A not partially overlapping in the mating direction with the projection 24*b* of the adjacent plug connector 5, is prevented from coming off by being locked to the receptacle connector 4 by the first locking part 31. The first locking part 31 locks the plug connector 5 to the receptacle connector 4, and prevents mating of the receptacle connector 4 and the plug connector 5 from being easily released. Furthermore, the plug connectors 5B, 5C, and 5D are prevented from coming off by the projections 24*b* of the adjacent plug connectors 5A, 5B, and 5C closer to −Y.

As illustrated in FIG. 14, the projection 24*b* and the step 24*c* have faces opposing in the mating direction (faces with a normal line in the mating direction), and the faces make contact with each other. This prevents the plug connectors 5 (5A to 5D) from easily coming off in the mating direction.

Further, as illustrated in FIG. 10, the plug terminal 21 in the plug connector 5 is connected to the electrical cable 7. As illustrated in FIG. 14, the projection 24*b* projects in a direction along the Y-axis direction in which the electrical cable 7 extends from the plug terminal 21, that is, toward the +Y direction. With this configuration, even when the plug connector 5 is subjected to a force of rotation about the X-axis direction due to weight or tension of the electrical cable 7 or the like, the projection 24*b* of the adjacent plug connector 5 prevents the plug connector 5 from rotating about the X-axis, thereby preventing the plug connector 5 from coming off the receptacle connector 4. Further, with this configuration of the projection 24*b* projecting in the +Y direction, the projection 24*b* can be prevented from interfering with mating of the receptacle connector 4 and the plug connector 5 when the plug connector 5D connected to the lowest electrical cable 7 mates first with the receptacle connector 4, as illustrated in FIG. 14.

The plug connector 5 includes the projection 24*b* on one end in the Y-axis direction perpendicular to the X-axis direction, and includes the step 24*c* on another end. With this configuration, the projection 24*b* of the plug connector 5 can be accommodated in the step 24*c* of the adjacent plug connector 5. Thus, the plug connector 5 can be prevented from easily coming off the receptacle connector 4 without increasing a height of the plug connector 5 from the board 6.

Figure 15A:
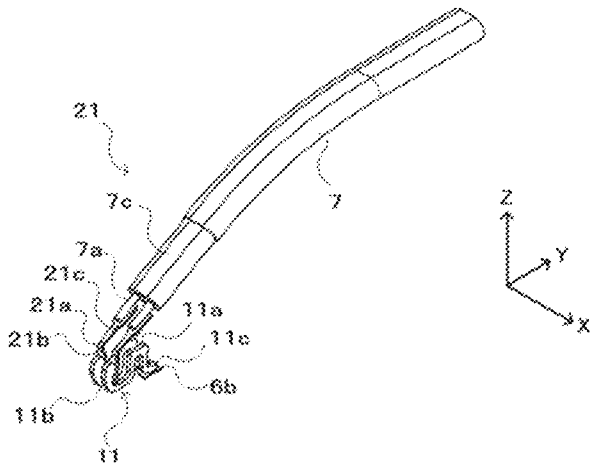
FIG. 15A is a perspective view illustrating a signal transmission path.
Figure 15B:
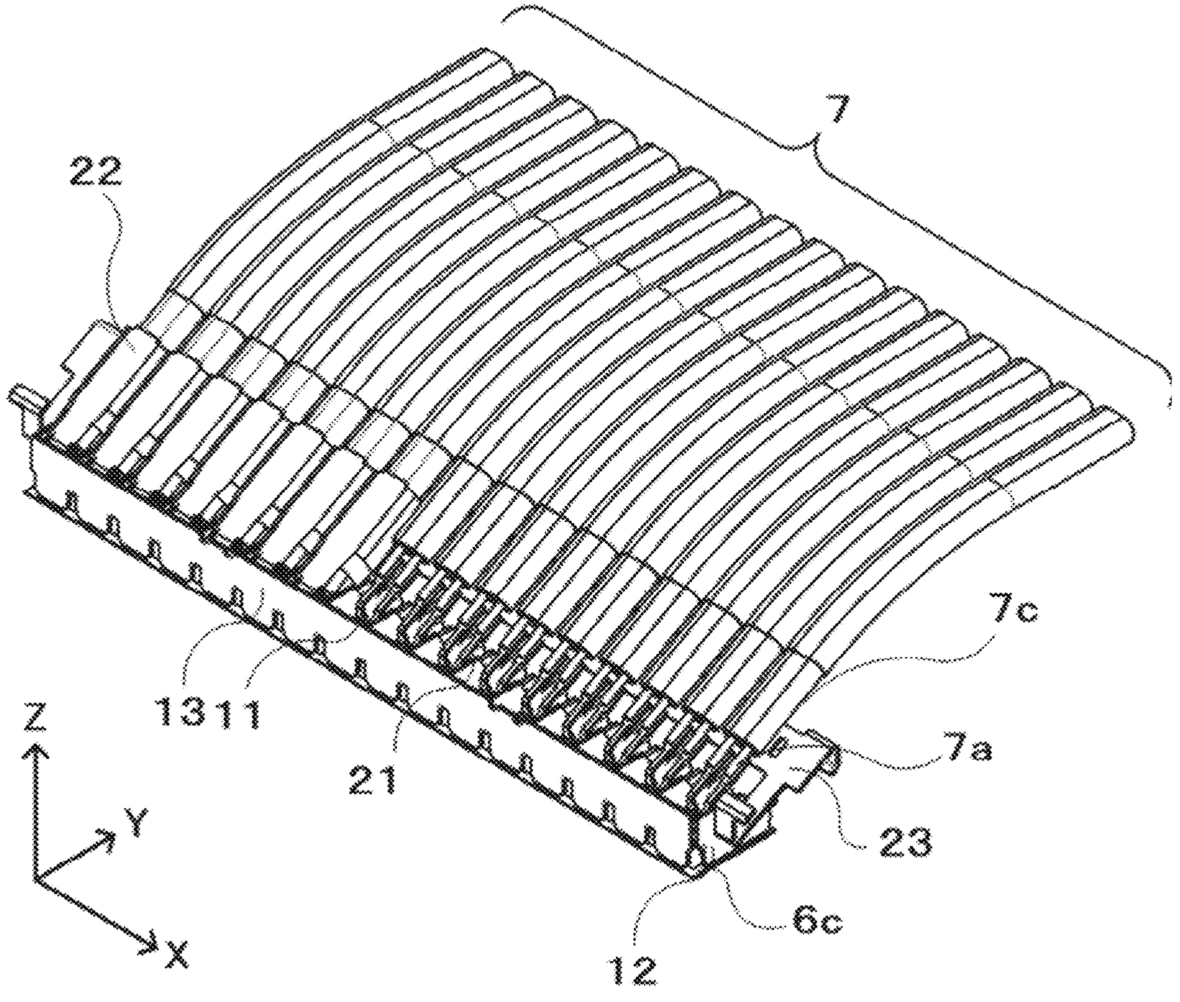
FIG. 15B is a view illustrating one receptacle connector and one plug connector, and is a perspective view illustrating the first shell and the plug housing partially omitted.

When the receptacle connector 4 mates with the plug connector 5, the receptacle terminal 11 makes contact with the plug terminal 21 on a one-to-one basis. Thereby, as illustrated in FIG. 15A, the signal electrode pattern 6*b* of the board 6, the receptacle terminal 11, the plug terminal 21, and the inner conductor 7*a* of the electrical cable 7 generates a signal transmission path. Further, as illustrated in FIG. 15B, the receptacle terminal 11 and the plug terminal 21 are surrounded by the shield plate 12, the ground plate 13, the first shell 22, and the second shell 23. The shield plate 12, the ground plate 13, the first shell 22, and the second shell 23 are connected to one another, and are further connected to the outer conductor 7*c* of the electrical cable 7 and the grounding electrode pattern 6*c*, and thus, the shield plate 12, the ground plate 13, the first shell 22, and the second shell 23 act as an electromagnetic shield around the signal transmission path.

Embodiment 2

Embodiment 2 of the present disclosure is described.

Figure 16:
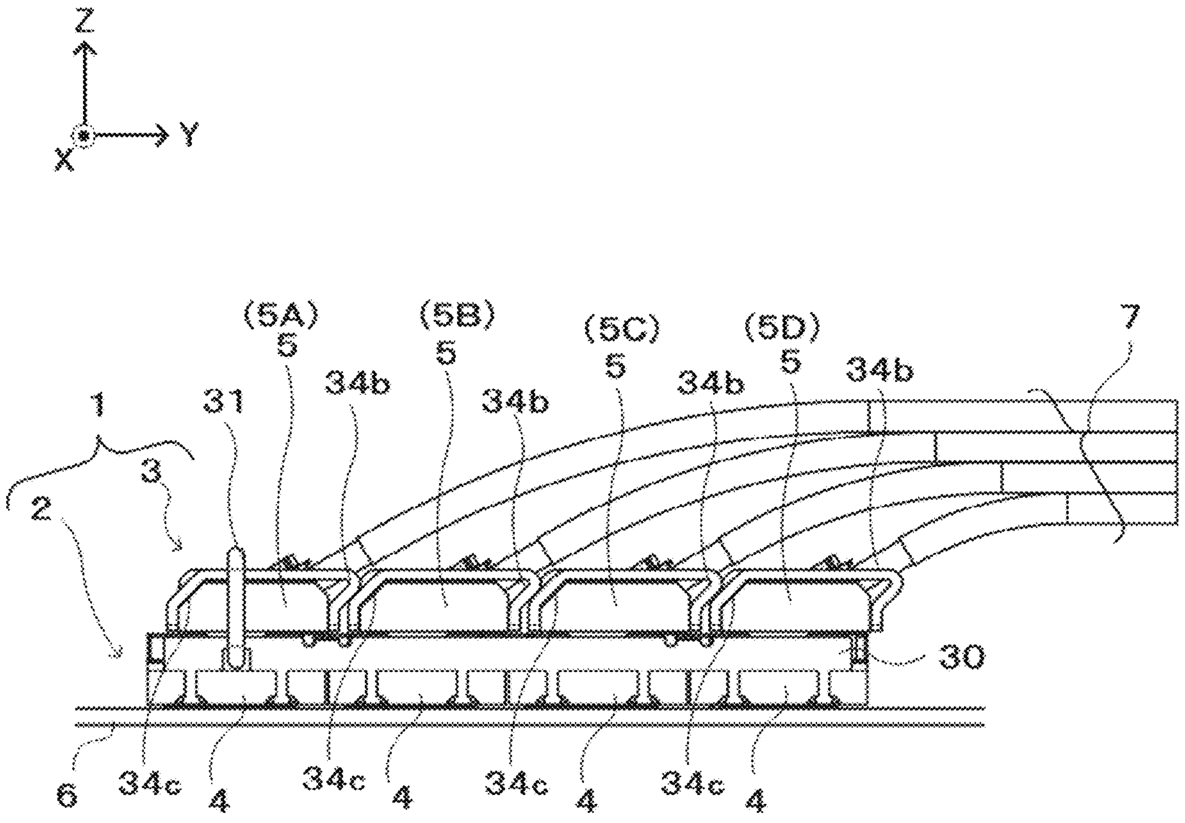
FIG. 16 is a side view of an electrical connector pair according to Embodiment 2 of the present disclosure.

As illustrated in FIG. 16, an electrical connector pair 1 according to the present embodiment is provided with, in comparison with the electrical connector pair 1 according to the above-described embodiment, a projection 34*b* and a step 34*c* instead of the projection 24*b* and the step 24*c*. In the present embodiment, faces where the projection 34*b* and the step 34*c* make contact with each other are inclined with respect to a plane perpendicular to a mating direction. With this configuration as well, a first locking part 31 or the projection 34*b* of an adjacent plug connector 5 interferes with a plug connector 5 coming off a receptacle connector 4, and thus, the plug connector 5 can be prevented from easily coming off the receptacle connector 4.

Embodiment 3

Embodiment 3 of the present disclosure is described.

Figure 17:
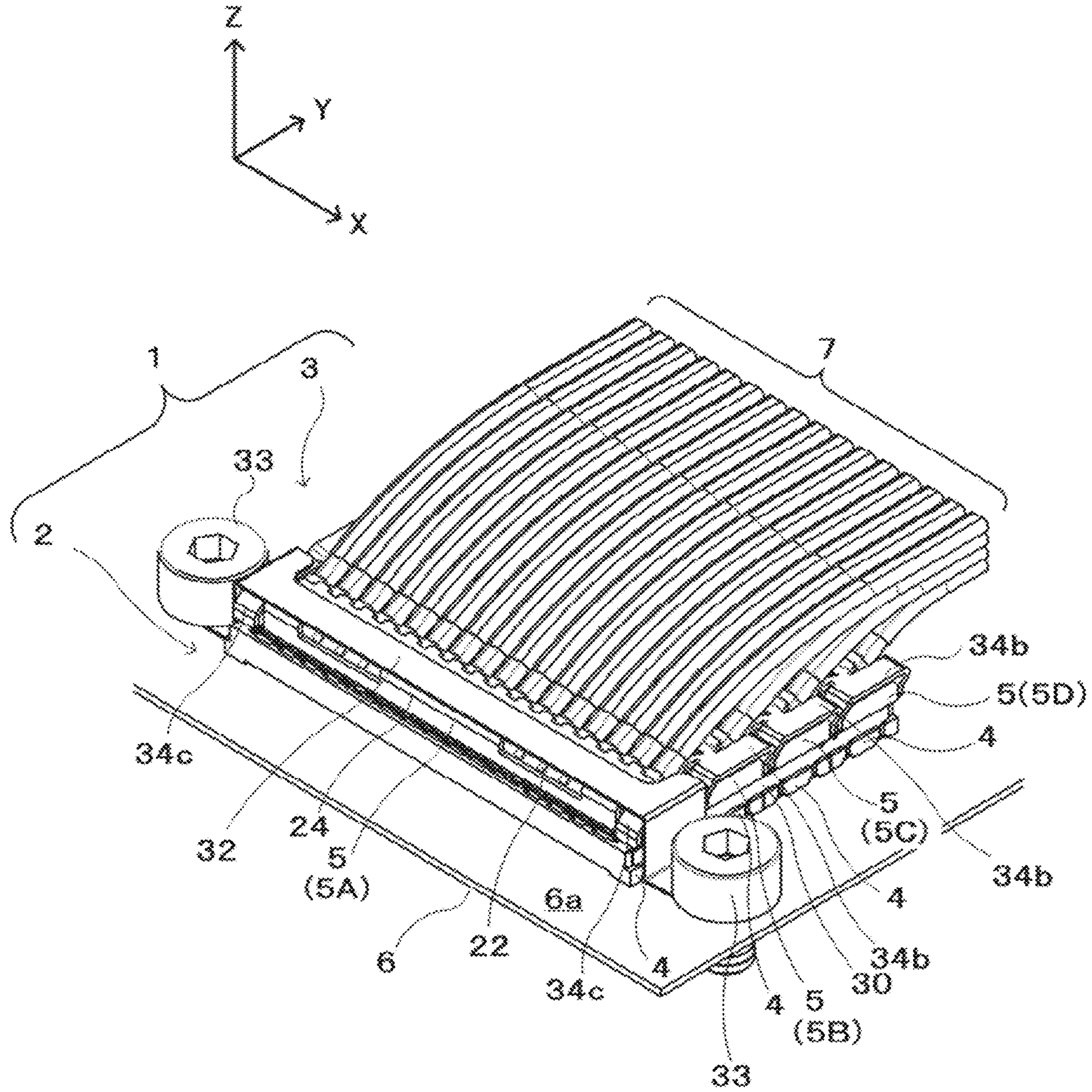
FIG. 17 is a perspective view of an electrical connector pair according to Embodiment 3 of the present disclosure.

As illustrated in FIG. 17, an electrical connector pair 1 according to the present embodiment is different from the electrical connector pair 1 according to Embodiment 2 described above in a point that the first locking part 31 is not provided. The electrical connector pair 1 according to the present embodiment includes a second locking part 32 and bolts 33 instead of the first locking part 31. The second locking part 32 is an elongated plate-shaped member extending in the X-axis direction. The second locking part 32 centrally covers a plug connector 5A not partially overlapping in a mating direction with a projection 34*b* of an adjacent plug connector 5 from above, and both ends in the X-axis direction of the second locking part 32 are bent and in contact with a board 6. The bolts 33 fasten both ends of the second locking part 32 to the board 6. Thereby, the plug connector 5A is locked to the board 6, and the plug connector 5A is prevented from being separated from a receptacle connector 4. Furthermore, plug connectors 5B, 5C, and 5D are prevented from coming off by projections 24*b* of the adjacent plug connectors 5A, 5B, and 5C close to −Y.

In the present embodiment, there are four arrays of the receptacle connectors 4. However, the present disclosure is not limited thereto. The number of arrays of the receptacle connectors 4 may be any number equal to or greater than 2.

Note that, in the present embodiment, the plug connectors 5 mate with all of the receptacle connectors 4. However, the present disclosure is not limited thereto. The plug connector 5 may only mate with at least one receptacle connector 4. In this case, a dummy connector mates with the receptacle connector 4 with which no plug connector 5 mates.

The dummy connector can be, for example, a connector to which no electrical cable 7 is connected, as illustrated in FIG. 13. In this case as well, the dummy connector has the same shape as the plug connector, and includes the projection 24*b* or 34*b* projecting in a first direction (+Y direction) in such a way as to overlap with the adjacent plug connector 5 when viewed from a mating direction in which the receptacle connector 4 mates with the plug connector 5.

Further, in the above-described embodiment, the projection 24*b* or 34*b* is at both ends in the X-axis direction of the plug connector 5. However, the present disclosure is not limited thereto. The projection 24*b* or 34*b* may be at both ends in the X-axis direction of the plug connector 5, or may be on an entire outer edge close to +Y extending in the +X-axis direction of the plug connector 5. Further, the projection 24*b* or 34*b* may project in the −Y direction.

In the above-described embodiment, the projection 24*b* or 34*b* is on the third shell 24. However, the present disclosure is not limited thereto. The projection 24*b* or 34*b* may be on the plug housing 20.

In the above-described embodiment, the receptacle connector 4 mates with the plug connector 5 in the normal direction of the mounting face 6*a*. However, the present disclosure is not limited thereto. The receptacle connector 4 may mate with the plug connector 5 in a direction inclined relative to the normal direction of the mounting face 6*a*. In any case, the projection 24*b* or 34*b* may only project in such a way as to overlap with the adjacent plug connector 5 when viewed from a mating direction in which the receptacle connector 4 mates with the plug connector 5.

SUMMARY (1) The electrical connector pair 1 includes the plurality of receptacle connectors 4 mounted on the mounting face 6*a* of the board 6 and arrayed in the Y-axis direction along the mounting face 6*a*, and the plurality of plug connectors 5 capable of mating with the receptacle connectors 4 on a one-to-one basis. The plug connector 5 includes the projection 24*b* or 34*b* projecting in the Y-axis direction in such a way as to partially overlap with the adjacent plug connector 5 when viewed from a mating direction in which the receptacle connector 4 mates with the plug connector 5. With this configuration, it can be expected that mating of the receptacle connector 4 and the plug connector 5 is prevented from being easily released even when subjected to a shock or a load.

(2) Further, the receptacle connector 4 includes the plurality of conductive receptacle terminals 11 arrayed in the X-axis direction along the mounting face 6*a*. The plug connector 5 includes the plurality of conductive plug terminals 21 making contact with the receptacle terminals 11, the insulating plug housing 20 holding the plug terminals 21, and the conductive third shell 24 covering at least a part of the outer periphery of the plug housing 20 in an insulated state from the plug terminals 21. The projection 24*b* or 34*b* is on the third shell 24. The conductive third shell 24 covering at least a part of the outer periphery of the plug housing 20 is provided with the projection 24*b* or 34*b*, and, with this configuration, it can be expected that the projection 24*b* is achieved with a simple structure by allowing the most peripheral member to project outward as is.

(3) The projection 24*b* or 34*b* is at both ends in the X-axis direction of the plug connector 5. With this configuration, the plug connectors 5 adjacent in the Y-axis direction can mate with each another at both ends in the X-axis direction, preventing coming off of the plug connector 5 with a contact array direction, that is, a long length, in the X-axis direction.

(4) Further, according to the electrical connector pair 1, the plug connector 5 is provided with the step 24*c* or 34*c* into which the projection 24*b* or 34*b* of the adjacent plug connector 5 fits. With this configuration, height reduction of the electrical connector pair 1 can be achieved.

(5) Further, according to the electrical connector pair 1, the projection 24*b* or 34*b* and the step 24*c* or 34*b* have faces opposing in the mating direction, and the faces make contact with each other. With this configuration, an area where the adjacent plug connectors 5 make contact in the mating direction can be increased, increasing an engagement force between the adjacent plug connectors 5.

(6) Further, according to the electrical connector pair 1, the plug terminal 21 is connected to the electrical cable 7, and the projection 24*b* or 34*b* projects toward a direction (+Y direction) along the Y-axis direction in which the electrical cable 7 extends from the plug terminal 21. With this configuration, the plug connector 5 can be prevented from coming off due to weight of the electrical cable 7.

(7) Further, according to the electrical connector pair 1, a dummy connector is included that mates with the receptacle connector 4 not mating with the adjacent plug connector 5, is of a same type as the plug connector 5 and provided with the projection 24*b*, and has no cable connected thereto. With this configuration, holding between adjacent connectors in the connector array 3 can be achieved by using the dummy connector even when no adjacent plug connector 5 is present.

(8) Further, according to the electrical connector pair 1, the first locking part 31 is included that locks the plug connector 5 to the receptacle connector 4, is attached to the receptacle connector 4, and prevents mating of the receptacle connector 4 and the plug connector 5 from being released. With this configuration, in addition to holding between connectors in the connector array 3, the plug connector 5 can be directly locked to the receptacle connector 4 to make mutual mating more secure.

(9) Further, according to the electrical connector pair 1, the second locking part 32 is included that locks the plug connector 5 to the receptacle connector 4, is fixed to the board 6, and prevents mating of the receptacle connector 4 and the plug connector 5 from being released. With this configuration, the plug connector 5 can be directly locked to the receptacle connector 4 to make mutual mating more secure even when no first locking part 31 is included.

(10) Further, according to the electrical connector pair 1, the plug connector 5 includes the projection 24*b* on one end in the Y-axis direction, and includes the step 24*c* on another end in the Y-axis direction. With this configuration, the adjacent plug connectors 5 can fit into each other by aligning the orientation of the projection 24*b* or 34*b* and the step 24*c* or 34*c*.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

| | |
|---|---|
| 1 | electrical connector pair |
| 2 | connector linkage |
| 3 | connector array |
| 4, 4A, 4B, 4C, 4D | receptacle connector (first connector) |
| 5 | plug connector (second connector) |
| 6 | board |
| 6a | mounting face |
| 6b | signal electrode pattern |
| 6c | grounding electrode pattern |
| 7 | electrical cable (cable) |
| 7a | inner conductor |
| 7b | insulator |
| 7c | outer conductor |
| 7d | protective film |
| 10 | receptacle housing |
| 10a | recess |
| 10b | contact press-fit part |
| 10c | shield plate press-fit part |
| 10d | ground plate press-fit part |
| 10e | mating recess |
| 10f | protrusion |
| 10g | receiving part |
| 11 | receptacle terminal (first contact) |
| 11a | fixing part |
| 11b | receptacle contact part |
| 11c | board connecting part |
| 12 | shield plate |
| 12a | body |
| 12b | board connecting part |
| 12c | shield plate press-fit part |
| 13 | ground plate |
| 13a | body |

-continued

| | |
|---|---|
| 13b | board connecting part |
| 13c | ground plate press-fit part |
| 20 | plug housing (housing) |
| 20a | cover connecting part |
| 20b | plug array part |
| 20c | mating protrusion |
| 21 | plug terminal (second contact) |
| 21a | fixing part |
| 21b | plug contact part |
| 21c | cable connecting part |
| 22 | first shell |
| 22a | opposing wall |
| 22b | side wall |
| 23 | second shell |
| 23a | extension |
| 24 | third shell (shell) |
| 24a | body |
| 24b | projection |
| 24c | step |
| 30 | linking part |
| 30a | body |
| 30b | extension |
| 30c | shaft support |
| 31 | first locking part |
| 31a | body |
| 31b | rotary shaft |
| 32 | second locking part |
| 33 | bolt |
| 34b | projection |
| 34c | step |
| 200 | plug mounting part |
| 201 | terminal fixing part |
| 202 | mating part |
| 203 | supporting part |
| P1 | first plug face |
| P2 | second plug face |

What is claimed is:

1. An electrical connector pair comprising:

first connectors mounted on a mounting face of a board and arrayed in a first direction along the mounting face; and second connectors capable of mating with the first connectors on a one-to-one basis, wherein the second connectors each include a projection projecting in the first direction in such a way as to partially overlap with an adjacent second connector of the second connectors when viewed from a mating direction in which the first connectors mate with the second connectors.

2. The electrical connector pair according to claim 1, wherein the first connectors each include conductive first contacts arrayed in a second direction perpendicular to the first direction along the mounting face, the second connectors each include:

conductive second contacts making contact with the first contacts;

an insulating housing holding the second contacts; and a conductive shell covering at least a part of an outer periphery of the insulating housing in an insulated state from the second contacts, and the projection is on the conductive shell.

3. The electrical connector pair according to claim 2, wherein the projection is at both ends in the second direction of the second connector.

4. The electrical connector pair according to claim 1, wherein the second connector is provided with a step into which the projection of the adjacent second connector fits.

5. The electrical connector pair according to claim 4, wherein the projection and the step have faces opposing in the mating direction, the faces making contact with each other.

6. The electrical connector pair according to claim 2, wherein the second contact is connected to a cable, and the projection projects in the first direction toward a direction in which the cable extends from the second contact.

7. The electrical connector pair according to claim 6, further comprising:

a dummy connector that mates with the first connector not mating with the second connector, is of a same type as the second connector and provided with the projection, and has no cable connected thereto.

8. The electrical connector pair according to claim 1, further comprising:

a first locking part that locks, to the first connector, the second connector not partially overlapping in a mating direction with the projection of the adjacent second connector, is attached to the first connector, and prevents mating of the first connector and the second connector from being released.

9. The electrical connector pair according to claim 1, further comprising:

a second locking part that locks, to the first connector, the second connector not partially overlapping in a mating direction with the projection of the adjacent second connector, is fixed to the board, and prevents mating of the first connector and the second connector from being released.

10. The electrical connector pair according to claim 4, wherein the second connector includes the projection on one end in the first direction, and includes the step on another end in the first direction.

* * * * *